H. H. BRIDENTHAL, Jr.
GRAIN-BINDERS.

No. 193,637.    Patented July 31, 1877.

5 Sheets—Sheet 1.

Witnesses.    Inventor.

5 Sheets—Sheet 5.

H. H. BRIDENTHAL, Jr.
GRAIN-BINDERS.

No. 193,637. Patented July 31, 1877.

Witnesses.
B. C. P. McGuire
H. A. Smith.

Inventor.
H. H. Bridenthal Jr.

UNITED STATES PATENT OFFICE.

HARRY H. BRIDENTHAL, JR., OF LATROBE, PENNSYLVANIA.

IMPROVEMENT IN GRAIN-BINDERS.

Specification forming part of Letters Patent No. 193,637, dated July 31, 1877; application filed August 23, 1876.

*To all whom it may concern:*

Be it known that I, HARRY H. BRIDENTHAL, Jr., of Latrobe, in the county of Westmoreland and State of Pennsylvania, have invented certain new and useful Improvements in Grain-Binding Harvesters; and I do hereby declare the following to be a full, clear, and exact description thereof, that will enable others skilled in the art to which it appertains to make and use the same, reference being had to the drawings, forming a part of this specification, in which—

Figure 1:
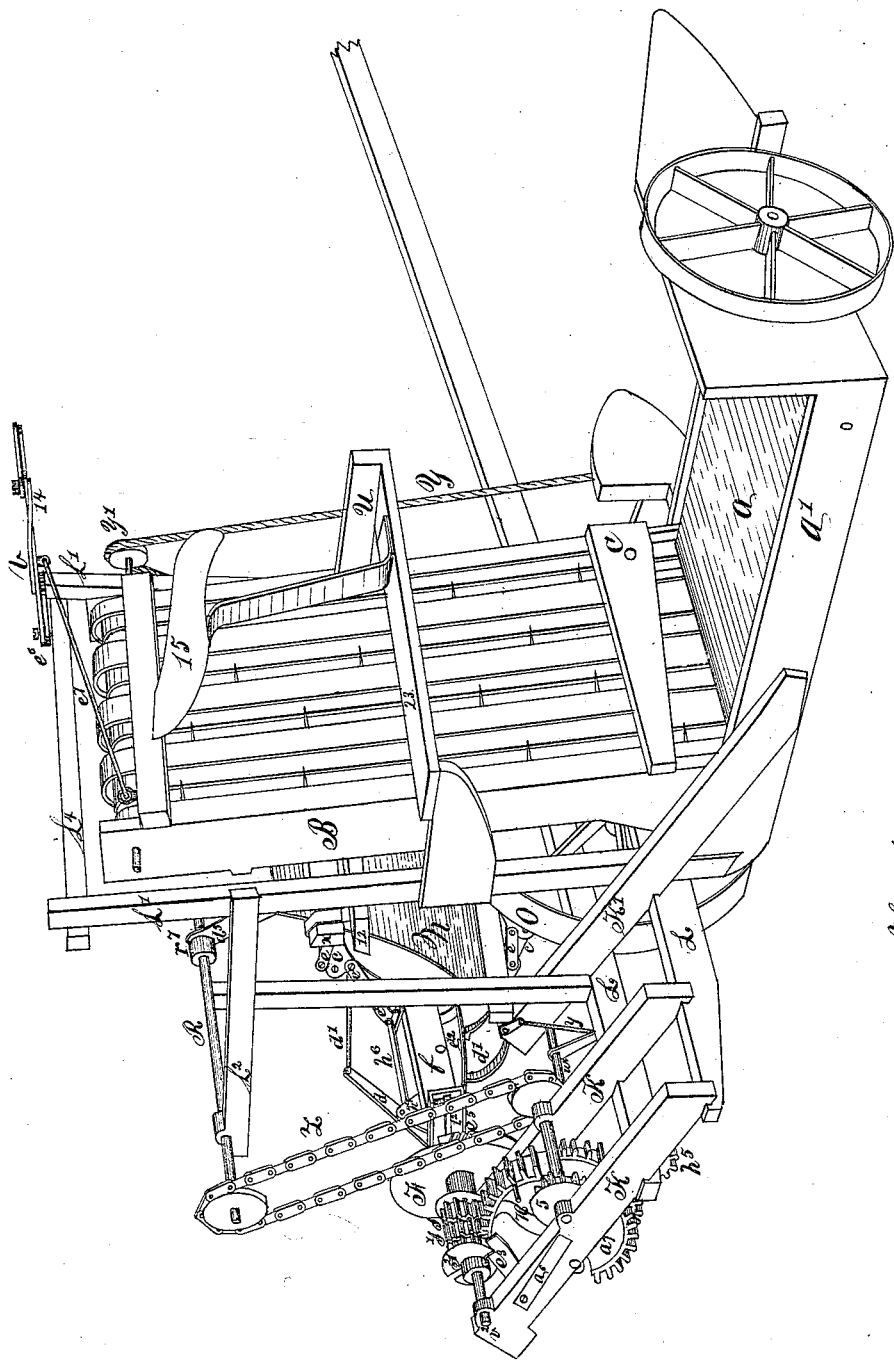
Figure 2:
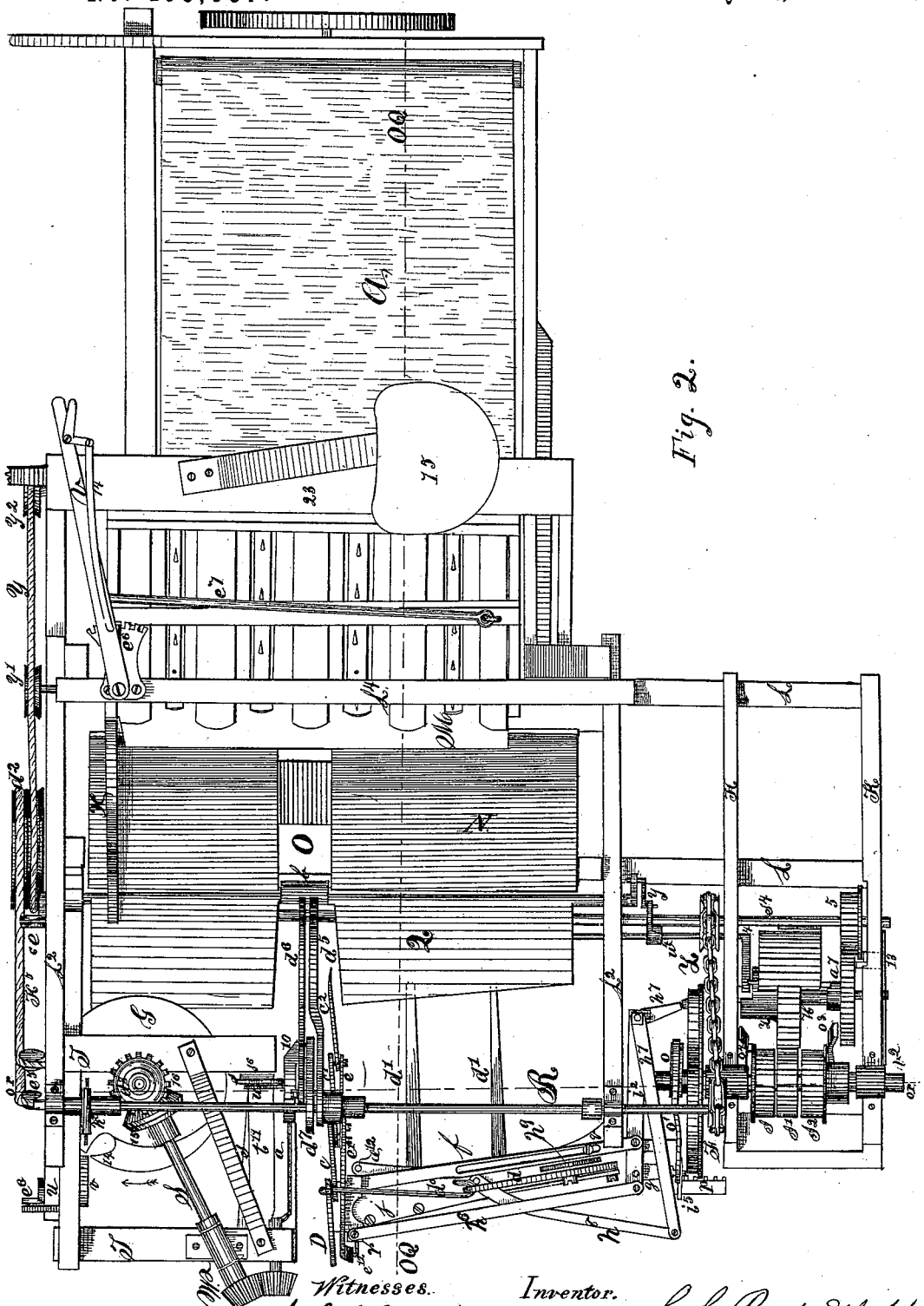
Figure 3:
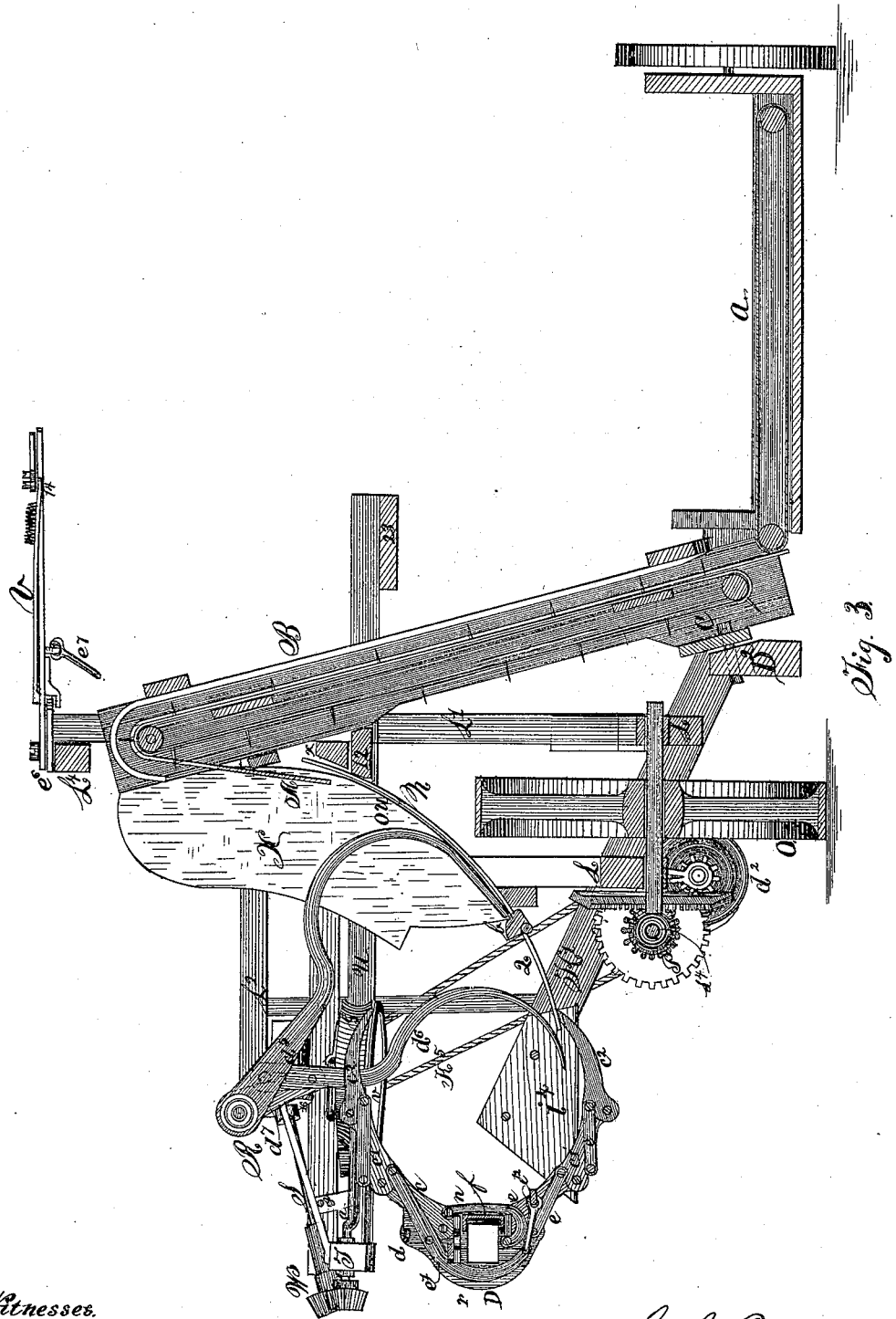
Figure 4:
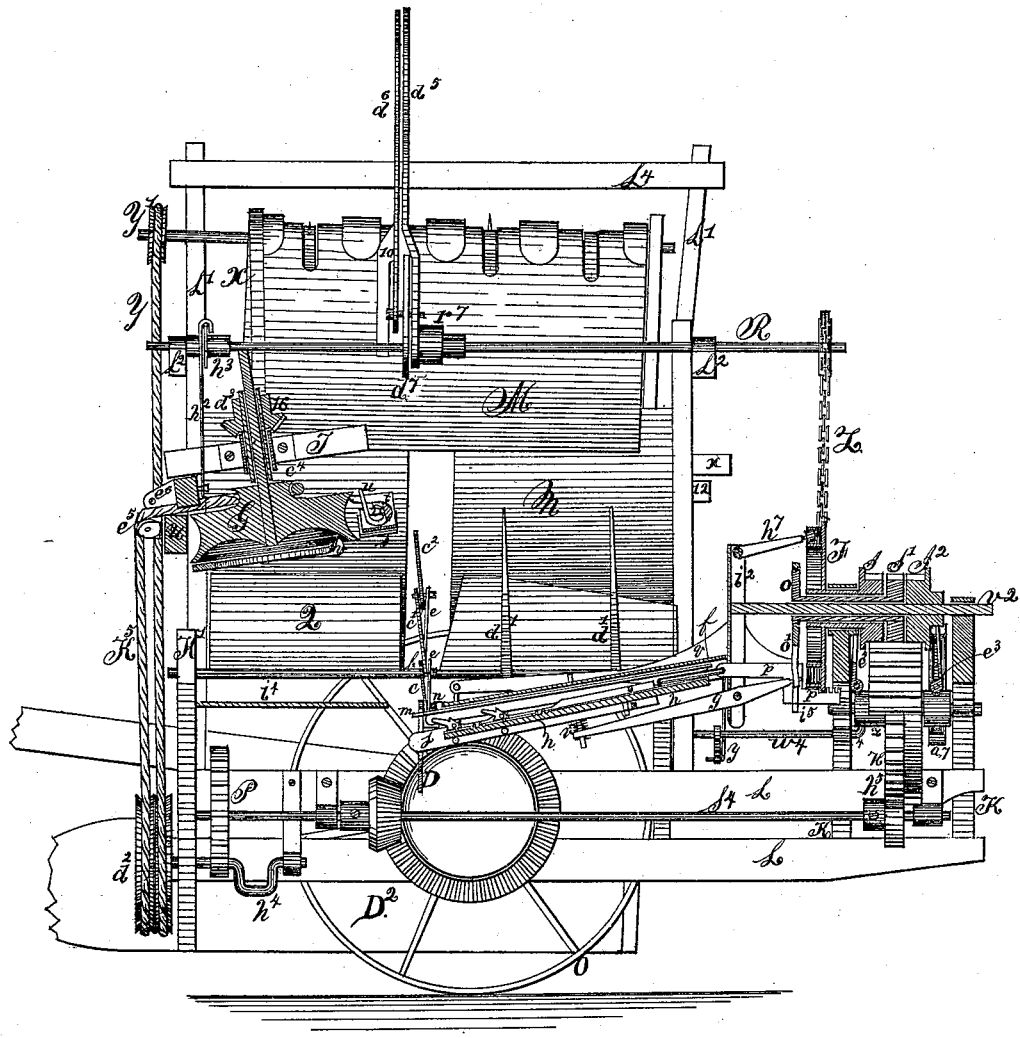
Figure 5:
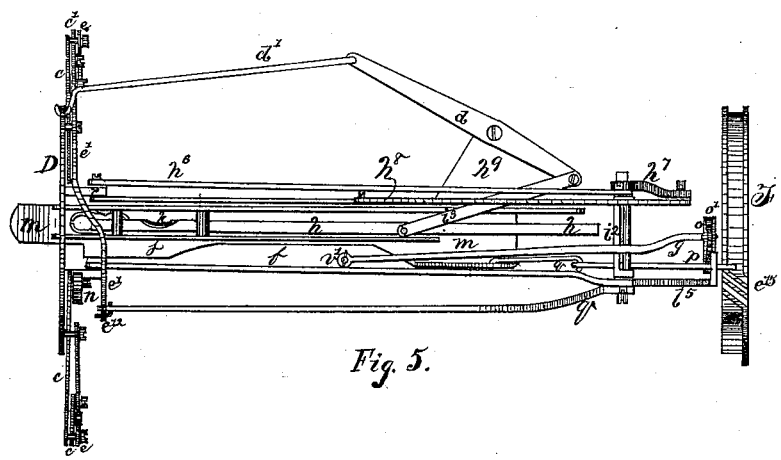
Figure 6:
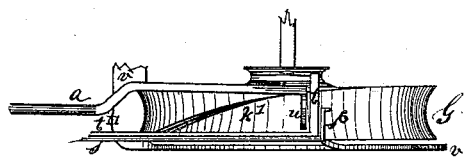
Figure 7:
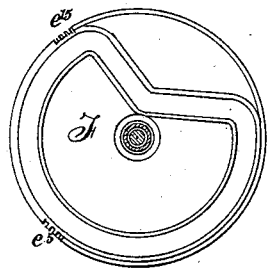
Figure 12:

Figure 1 is a perspective view of my improved machine, taken from the rear grain-sickle corner. Fig. 2 is a top view of the whole machine. Fig. 3 is a vertical sectional view taken through the line O Q O Q, Fig. 2, and looking forward. Fig. 4 is a vertical sectional view taken through the line $o\ r\ o\ r$, Fig. 2, and looking toward the grain-sickle of the machine. Fig. 5 is a detached top view of the gavel-holding and band-knotting devices. Fig. 6 is an elevation of the separating-wheel G. Fig. 7 is a front view of the groove-cam operating the knotting devices. Fig. 12 is a vertical sectional view of the knotting-frame taken through the line $o\ v\ o\ v$, Fig. 8; and Figs. 8, 9, 10, 11, and 13 are views illustrating the operation of forming the connection in the band.

My invention relates to that class of grain-binders wherein the grain is conveyed from the finger-bar to the sickle of the machine, thence upward over the drive-wheel to the binder, where it is bound with the straw of the gavel; and the objects of my invention are to improve the construction of harvesting machinery, making it more effective in operation, convenient to use, and to bind the sheaves of grain in a better and more substantial manner; and it consists in the novel arrangement of swinging elevator-belt frame and adjusting-lever in combination with swinging-bottom grain-receiver and double compressor-charging arm; in combination of jointed holding-arms swinging holding-head; in a twisting device which receives the ends of the straw from the separating-wheel, and forms the same into a band about the gavel; and it further consists in the combination and arrangement of various devices and mechanism connecting the various elements to complete the machine, as will be hereinafter explained, and specifically claimed.

Similar letters and figures of reference where they occur in different figures refer to like parts of the machine in all of the drawings, in which—

L K is the main frame of my improved machine. The main base-rails L L are arranged on opposite sides of the drive-wheel O in such a manner that the bearing of the inner end of the main axle rests on the top of the inner rail, while the opposite end bearing of the said axle rests on the under side of or beneath the outer rail. To the top of the base-rails L L are firmly bolted the inclined transverse rails $K^1 K^1$. The rails $K^1$ form the main support to the finger-bar frame $a^1$, and the top frame $L^1 L^2 L^4$, the latter of which, in turn, supports the swinging elevator-belt frame B. The rear post $L^1$ is leaned rearward at the top, thus making the frame $L^1$ wider at the top than at the bottom, for the purpose of allowing the elevator-belt frame B, which is pivoted to the main-frame rail $D^2$ at the bottom, while the top rests against the rail 12, to swing a short distance backward and forward at the said top, for the purpose of delivering the grain to the binder at different points, thus allowing the band to be formed at a greater or less distance from the butt-end of the gavel, as may be desired.

The driver's seat 15 is mounted upon the board 23, which is supported forwardly by the rail U and rearwardly by a projection attached to the rear post $L^1$. To the top rail $L^4$ is securely attached the notched arc-piece $e^6$, to which, and within convenient reach of the driver, is pivoted the lever V, which is provided with a hand-lever and spring-bolt, 14, which engages the notches in the said arc-piece $e^6$. The forward end of the rod $e^7$ is pivoted to an eye on the lever V, while the rear end is pivoted to an eye firmly secured to the top of the elevator-belt frame B. By this construction the operator can, while the machine is in operation, shift the elevator-frame at pleasure, so that the machine can be controlled while in motion, so as to form the band at the proper place on long or short grain-bundles.

The elevator-belt frame B is complete in itself, containing the upper and lower belt-rollers, to the upper of which motion is communicated by means of the belt $y$ from the driving-pulley $d^2$. The belt $y$ also passes around and communicates motion to the lower apron-pulley $y^2$. The pulleys $d^2$, $y^1$, and $y^2$ are somewhat deeply grooved, or they may be substituted by sprocket-wheels and a chain, so that the swinging movement of the upper pulley will not materially interfere with the working of the belt or chain.

The elevator-frame B is pivoted to the main frame at a point at or near its lower forward corner, so as not to interfere with the tension of the belt $y$; also for the purpose of preventing the said lower forward corner of said frame from projecting beneath the main frame D and striking the ground when the top is thrown forward.

To the elevator-frame B is attached the deflecting-apron M, which projects downward over and past the upper eye of the receiver N in such a manner as to allow the frame B to move freely, as described, and the grain to pass into the receiver.

To the upper forward corner of the frame B is pivoted the board X, which has for its purpose to keep the butt-ends of the gavel straight and even while a gavel is accumulating in the receiver. The said board X is firmly attached to the sliding rail $x$, and is thus kept rigidly in a vertical position, while it is free to move back and forth with the top of the frame B, while the lower end slides upon the stationary receiver-back N.

To the outer main-frame rails L are secured bearings, in which is hung the long shaft $S^4$, which receives motion from the drive-wheel O by means of a large bevel-gear wheel and pinion. On the forward end of the shaft $S^4$ is attached the spur-gear wheel P, which meshes with a pinion on the crank-shaft $h^4$. To the forward end of said crank-shaft is hung the double driving-pulley $d^2$, one part of which drives the delivering aprons or belts, as before described, while the other part drives the band-forming mechanism. The crank $h^4$ has for its purpose to operate the sickle, which, forming no part of this invention, is therefore omitted.

The main-frame rails L L project some distance beyond the rear of the receiver and elevating frames, and to which projecting ends are secured the projecting inclined traverse-rails K K, which have for their purpose to support the holding and rotating gear. To the outer ends of the traverse-rails K, and within suitable bearings, is secured the shaft $v^2$, to the forward end of which is secured the T-head $i^2$, to one end of which is pivoted the rear ends of the parallel bars $f$ and $h^6$. The main parallel bar $f$ is made broad, and is provided with flanges on both edges to secure the requisite stiffness. To the opposite ends of the parallel bars $f$ is pivoted the swinging holding-head D by means of suitable lugs formed thereon. The shaft $v^2$ receives motion from the driving-wheel H through the tight pinion $I^2$ in a manner hereinafter described. The motion of the parallel bars $f$ is controlled by the lever $g$, which is pivoted to the T-head $i^2$. The forward end of the lever $g$ is connected with the bar $f$ by means of the bolt and coil-spring $v^1$. The motion of the said lever $g$ is governed by the middle pinion $I^1$, which is, by means of a sleeve, connected with the eccentric $o$ and eccentric-strap $o^1$, the latter of which is pivoted to the rear end of the said lever $g$.

The holding-head D consists of the main head or plate D, to which is pivoted a pair of arms, each of which consists of a series of three, more or less, short joints or arms, $c\ c^1\ c^2$, pivoted together, and which are, in turn, diagonally connected with each other and with the main head D by means of the links $e, e, e,$ and $e^1$. Both arms or series of arms are diagonally connected with each other by the curved link $n$ in such a manner as to operate in conjunction. The whole system of joints or arms is relatively so proportioned and arranged that the ends of the arms $c^2$ pass each other right and left, and, when the said points meet, the arms and the head D will form a complete circle, which will retain the outlines of a circle when contracted to the dimensions of the smallest-sized sheaf. The inner edges of the short joints $c\ c^1\ c^2$ are shaped to correspond with the arc of a circle equal in diameter to the diameter of an ordinary-sized sheaf, which is about eleven inches, the largest size usually made being about fourteen inches, while the smallest are about seven inches. By this construction large and small gavels are grasped and held in proper shape for binding with equal facility.

The connecting-link $e^1$ is extended and curved over to the opposite side of the head D, where it is, by means of a short link, connected with the forward end of the arm $q$. The rear end of the said arm $q$ is rigidly connected with the T-head $i^2$; hence it will be seen that by swinging the head D upon the bars $f$ and $h^6$, motion will be communicated to the arms $c\ c^1$, by the lever $e^1$ and arm $q$. The arms $c^1$ and $q$ and the bar $f$ are so relatively proportioned that the radial movement of the head D relative to the axis of the shaft $v^2$ will just equal the radial movement of the arms $c\ c\ c$ relative to each other; hence the center of the circle formed by the head D and said arms $c\ c\ c$, whether large or small, will constantly correspond with the axial line of the shaft $v^2$; hence different-sized gavels which are held within the head D will all be rotated about an axis central to said different-sized gavels.

To the outer ends of the horizontal cross-rails $L^2\ L^2$ is hung the shaft R, to the rear end of which is attached a chain-pulley, which is, by the chain Z, connected with a similar chain-pulley on the end of a shaft revolving in bearings on the transverse bars K K, and which receive intermittent rotary motion from the drive-wheel H by means of the segment $a^7$ and the pinion 5. A ledge on the forward end of the said segment $a^7$ raises a spring-latch, 13, out of a notch in a disk attached to the pinion 5 when about to intermesh therewith. The said spring-latch serves to hold the pinion 5 and the shaft R in position when not engaged by the said segment $a^7$, which has a sufficient number of teeth to cause the pinion 5 with the shaft R to make one revolution as it passes. To the shaft R, at a point just forward of the holding-head D, is secured the gaveling-arms $d^5$ and $d^6$.

The arm $d^5$ is secured to the shaft R by means of a loose sleeve, while the forward arm $d^6$ is pivoted to the end of the short rigid arm $d^7$, which is provided with a lateral slot between the pivot of the arm $d^6$ and the shaft R, through which and through a longitudinal slot in the end of the arm $d^6$ a bolt passes, connecting the two arms in such a manner that when the arm $d^5$ is detained during the revolution of the shaft R the arm $d^6$ will be moved forward a distance equal to or more than the distance which the said arm $d^5$ has been detained. A sprig, 10, holds the said arms $d^5$ $d^6$ in the position shown in Figs. 2 and 4. To the frame $L^1$ $L^2$ is secured the stationary receiving-apron N, which is curved nearly to conform with the path of the points of the arms $d^6$, the points of which pass along an opening in said apron.

To the lower edge of the apron N is hung, within suitable bearings, the swinging apron Q, to the rear end of the shaft of which is secured a short crank. Said crank is, by a connecting-rod, connected with an arm on the shaft $w^4$, an arm, 4, on the rear end of which rests upon the cam-hub $z$ of the drive-wheel H. A depression in the said hub $z$ allows the apron Q to fall to the position shown in Fig. 3, when a gavel is carried from the receiver to the holding-head, by the arms $d^5$ $d^6$. A stop, $b$, on the shaft of the apron Q, serves to detain the arm $d^5$, as shown in Fig. 3, for purpose as will be hereinafter explained. To the arm $e^{12}$ is secured a pair of curved arms, $d^1$ $d^1$, which have for their purpose to prevent the top end of the gavel from falling while being carried from the receiver to the holding head. A stationary platform, $i^4$, firmly attached to the forward cross-bar $K^1$, serves a similar purpose at the butt-end of the gavel.

To a forward cross-rail, U, is hinged the swinging frame T, upon which is mounted the band-straw-separating wheel G and the band-twister $a$. The straw-separating wheel G is a wooden wheel hung upon a shaft vertically adjustable within the gear-sleeve $d^3$. The point 16 of the said separator is formed on the lower outer edge of the rim, which is inclined downward, making the under side convexed, as shown in Fig. 4, and is cut away in the rear of the point, forming a thin lip or disk, above which rises the cam-shaped shoulder 14, as shown in Fig. 2.

The separating-wheel is provided with a spiral groove or dentation, $K^1$, through which passes the gathering-arm $u$ of the twister $a$, thereby insuring the proper transfer of the straw to said twister. The separating-wheel G receives motion from the double driving-pulley $d^2$ by the belt $K^5$, which passes over a pair of guide-pulleys, $e^5$, attached to the cross-rail U, and in axial line with the hinges $e^6$ of the frame T.

The separating-wheel G and the twister $a$ are connected by the rigid gears 16 and W. These members are so arranged that the twister and separating-wheel rotate with equal speed.

The twister consists of the bent shaft $a$, which terminates with the circular or ring-shaped head $u$, which is provided with an opening at one side, and from which projects an arm, as shown in Fig. 4, and it revolves close to a somewhat similar but reversed stationary head, $t$, on the end of the arm $t^{11}$, which has for its purpose to confine the straw in proper shape and within the twister, as it is twisted and passes through the opening 21.

The arm of the stationary head projects horizontally toward and nearly to the separating-wheel G, and is for the purpose of guiding the straw into the said opening or ring 21.

To the under side of the arm $t^{11}$ is secured the broad spring-arm $s$, which is placed close to the rim of the wheel G, and upon its end is a ledge or upward projection, $s^6$, which rises close to the stationary head $t$, and on the opposite side from the revolving head $u$, and to a sufficient height to cover about one-half of the opening 21, when it is closed against the arm $t^{11}$.

When the machine is in operation the spring-piece $s$ rests on the surface of the gavel, and when there is a full-sized band flowing through the twister the ledge $s^6$ is depressed, thereby forcing the spring-piece $s$ and the straw of the said gavel below the path of the point 14 of separating-wheel, thus preventing the said wheel from raising more straw than is necessary for the binding of the sheaf.

To the frame T is secured the stout bar or rod $v$, which is curved to correspond with and passes nearly around the separator-wheel, beneath and close to the path of the point 14, to a point near the twister, where it is gradually curved in and upward, terminating with a beveled point inside and above the said path of the point 14. The object of this construction is to prevent the wheel G from catching the straw of the gavel, except at a point at or near the twister, thus protecting the gavel from being torn or disarranged by the said separator.

The particular shape of the guard $v$ enables detached straws, which may become entangled therewith, to be carried by the wheel G around to and off the free point or end of said guard, thereby preventing their accumulation. The frame T is supported by means of the rod $h^2$, the lower end of which is pivoted to the said frame T by means of an eye or other suitable device, while on the upper end is formed a suitable hook, which rests upon the cam-disk $h^3$ on the shaft R.

The disk $h^3$ is of such shape, and is secured to the shaft R in such a position, as to allow the frame T to rest on the gavel only at such times as are necessary for the formation of the band, while it is raised at other times so as not to interfere with the changing of the head D, or the discharging of the bound sheaf.

The band-connecting device consists of a reciprocating frame, $j$, the forward end of which plays through an opening in the head D, and in such a manner as to play vertically a short distance relative to the radius of the gavel, while the rear end of said frame is secured by a bolt which plays within a slot in the flange of the parallel bar $f$. The frame $j$ is, by means of a connecting-rod, connected with an arm of the rock-arm $h^7$, which is pivoted to the opposite end of the T-head $i^2$, from the parallel bar $f$.

The opposite arm of the rock-arms $h^7$ plays within the groove of the cam-groove plate F, which receives motion from the drive-wheel H through the forward pinion I, to which it is connected by a sleeve, as shown in Fig. 4.

To the forward end of the reciprocating frame $j$ is pivoted a pair of oscillating tines, $i^1$ $i$, each of which are provided with a toothed segment, which meshes with corresponding segments on the reciprocating bar $h$. The bar $h$ is operated by means of the lever $d$, which is pivoted to the projection $h^9$, attached to the frame $j$. One end of the said lever $d$ is connected with the said bar $h$, while the opposite end is connected, by means of a rod, $d^1$, to some part of the compressor, as the head $i^2$ or the head D. Hence, when the frame $j$ is reciprocated longitudinally, a similar reciprocating motion will be transmitted to the bar $h$, within the said frame $j$.

Figure 8:
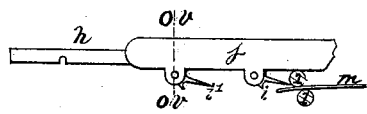
Figure 9:
Figure 13:
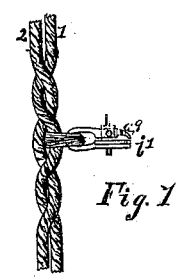
Figure 11:

The before-mentioned segments on the bar $h$ are so arranged that the backward movement of said bar $h$ will bring the tines $i^1$ $i$ successively to the relative positions as shown in Figs. 8, 9, and 11. A flange upon the bar $h$, which plays upon faces formed upon the segmental part of the said tines, holds them in their proper position. The forward tine $i^1$ is formed in two pieces or parts. One part $a^9$ is pivoted to the shaft of the main tine, so as to swing laterally thereon. The ends of both parts are curved, so as to form an eye when brought together, as shown in Fig. 13. When the tine $i^1$ is brought to a vertical position relative to the frame $j$, a ledge, $l$, on said frame deflects an upward-projecting arm on the pivoted jaw or hook $a^9$ into the corresponding dentation in the bar $h$, thus operating the hooks, as shown in Fig. 12, for the purpose of seizing a bunch of the straw of the gavel and drawing it in a loop through between ends of the band, where they are twisted together, as shown in Fig. 13, for the purpose of preventing them from untwisting, and thus secure the connection. $m$ is a slide, placed upon the parallel bar $f$, and beneath the frame $j$, where it moves longitudinally between the flanges of said bar, and has for its purpose to assist the knotting-tines in the operation of connecting the ends of the band, and is connected with the slide $p$, which reciprocates in bearings on the head $i^2$ and arm $i^5$.

Upon the inner edge of the slide $p$ is formed a series of teeth, which play within or between a pair of corresponding diagonal ledges, $e^5$, formed upon the perimeter of the cam-groove plate F, the whole being so arranged that the slide $m$ will be moved out, as shown in Fig. 5, and quickly withdrawn at the proper time, as will be hereinafter described.

H is the drive-wheel of the holding and knotting mechanism, and is hung on a shaft on the cross-bars K, and receives motion from the pinion $h^5$ on the shaft $S^4$. The said drive-wheel meshes with the middle pinion $I^1$, and upon its rear side are formed segments, which mesh with and revolve the rear pinion $I^2$ and the compressor-head through the shaft $v^2$. When the pinion $I^2$ is not engaged by the said rear segments, a pawl, $e^3$, engages one of two notches formed in opposite sides of a disk attached to the rear side of the said pinion. The said segments are provided with projections for the purpose of raising the pawl $e^3$ out of the notches when about to engage the said pinion.

The forward pinion I is operated substantially in same manner as the opposite rear pinion by means of segments and projections formed on the forward side of the driving-wheel H.

The governing or actuating wheel H turns one revolution during the operation of binding one sheaf. It must, therefore, revolve quite slowly, turning one revolution while the driving or ground wheel turns one and a half or two revolutions, or one revolution while the machine moves over a space of eighteen or twenty feet while in operation in the field. This, being about the proper speed, would, if the motion were applied through or by means of its shaft, necessitate the use of a special train of gears to reduce the speed and communicate said motion properly. The said speed-reducing gear and the hub and arms of the wheel H would have to be made very heavy and cumbersome, so as to withstand the increased strain consequent in reducing the speed of the parts, thus largely increasing the weight and draft of the machine. To obviate this difficulty, I make the segmental actuating-wheel H with a continuous section of teeth on its perimeter. I am, therefore, enabled to communicate motion to it by means of the small rapidly-revolving pinion $h$, which meshes with the said continuous toothed part in common with the pinion $I^1$, as shown.

The small driving-pinion $h$ may be placed at any point about the wheel H, or in the position shown, or it may and would be better if placed quite near the pinions I $I^1$ $I^2$, where motion could be communicated to it by means of the belt which operates the elevators.

By this construction, the members which communicate motion to the binder may be reduced to a minimum, both in number and weight. The spider of the wheel H may be made very light, as it is only necessary for it to have just sufficient strength to steady the perimeter, as there is no special strain imposed upon it.

A clutch may be introduced between the shaft $S^4$ and the pinion $h^5$, the controlling mechanism of which may be so arranged as to be in convenient reach of the hand or foot of the operator, who could stop and start the binding mechanism at pleasure, so as to control the size of the sheaves.

The operations of my machine are substantially as follows: The holding-head being in the position shown in Fig. 4, the segment $a^7$ will be engaged with the pinion 5, and, in the manner before described, cause the arms $d^5$ $d^6$ to turn one revolution. At the same time the arm 4, on the end of the shaft $w^4$, will drop into a depression in the hub $z$, thereby permitting the apron Q to fall to the position shown in Fig. 3, when the stop $b$ will be in position to intercept and stop the dividing-arm $d^5$, while the gaveling-arm $d^6$ will carry the grain from the receiver to the arms of the head D, stopping in the position shown in Fig. 3. The stream of grain which the elevator is in the mean time carrying to the receiver will be thrown into the narrow angle formed by the arm $d^5$, and the curved back N of the receiver where it is caught and retained, thus making a complete separation from the gavel. The arms $d^5$ $d^6$ having turned one revolution, the segment $a^7$ will have passed the pinion 5, which is held as before described, and the apron Q will be raised by the arm 4 and hub $z$ to the position as shown in Fig. 4, thereby allowing the arm $d^5$ to pass the stop $b$, when the spring 10 brings the said arms together in the manner hereinbefore described, leaving the gavel free to be revolved by the head D. In the mean time the drive-wheel H will be in gear only with the middle pinion, the two opposite pinions being held, as before described. The said middle pinion will turn one-half of a revolution, carrying the eccentric $o$ to the opposite extremity of its throw, thereby causing the arms $c$ $c$ to encircle and hold the gavel in the manner hereinbefore described, and if said gavel be large the spring $v$ will yield, while if it be small the ends of the arms will pass each other, and thus accommodate themselves to the size of the said gavel.

A pair of projections on the drive-wheel H raises the pawls out of the pinions I and $I^2$, when a pair of segments engages the said pinions, turning the whole three, with their connections, one-half of a revolution, when the segment passes the forward pinion, and the ratchet engages it, thus holding the cam-disk F stationary, while the pinions $I^1$ and $I^2$, with their connections, turn one and a half revolution, the arm of the rock-shaft $h^7$ and the slide $p$ traveling around the said cam-disk F.

Figure 10:

The frame T will now be lowered, and the spring piece $s$ resting on the surface of the gavel, and with each revolution of the wheel G, the point 14 will catch beneath a wisp of straw, separating it from the said gavel. The twister will in turn receive the straw from the wheel G and twist the same into a continuous rope-band, which, being attached to the gavel, will, by the revolution of said gavel, be drawn from the twister through the stationary head $t^{11}$, and by depressing the spring-piece $s$ the quantity of straw raised by the wheel G and the size of the band will be regulated, as before described. The gavel having revolved nearly one revolution, the slide $p$ will have reached the series of diagonal ledges $e^{15}$ on the disk F, thus moving the slide $m$ forward and over the band at a short distance from the first-formed end thereof, which will hereinafter be designated as No. 1, while the opposite end will be termed No. 2, as shown in the drawings. End No. 2 of the band will then be formed over the slide $m$. The knotting-frame is then moved forward to the position shown in Fig. 8. The rear movement of the said frame $j$ thrusts the tine $i$ beneath end No. 2 over the slide $m$, which is then withdrawn by the slide $p$ and the inclined ledges $e^5$ on the cam F, thus leaving the said tine $i$ between the ends of the band. The rear segment on the bar $h$ now engages the segmental part of the said tine $i$, and reverses its position, so that its point meets the point of the forward tine $i'$, and turning the ends Nos. 1 and 2 one-half of a revolution about each other, as shown in Fig. 9. Further rearward movement of the frame $j$ withdraws the tine $i$ from the band, and thrusts the tine $i'$ in its place between the ends of the band, as shown in Fig. 10, when the forward segment on the bar $h$ engages the said forward tine, reversing it in a manner similar to the reversing of the rear tine, thus winding the ends of the band one complete revolution about each other. When the tine $i^2$ is about passing a position right angular to the frame $j$ the jaw $a^9$ will be opened, as shown in Fig. 12, and being of a sufficient length to enter the sheaf a short distance, so that, on being closed, it grasps a bunch of straw, which is drawn in a loop through the band-connection a short distance, when the arm of the said jaw $a^9$ drops into a second indentation in the bar $h$, releasing the loop, which remains in the band-connection, as shown in Fig. 13, for purposes as before described.

The binding of the sheaf having been completed, the rear longer segment of the drive-wheel H will have passed the pinion I², which will be held by the pawl $o^3$ in such a position that the head-piece D will be toward the receiver. The middle pinion will then be turned one-half of a revolution, thus throwing arms $c\ c$ open. The segment $a^7$ will now engage the pinion 5, thus causing the arms $d^5$ to swing around, throwing the sheaf out of the machine, when a second pair of projections and segments on the drive-wheel H engages the rear and forward pinions, reversing the head D, bringing it to the position shown in Fig. 3, when the pawls again catch the pinions, as before described. The revolution of the arms $d^5\ d^6$ sweeps another gavel from the receiver into the holder, and stop in the position shown in Fig. 3, and the drive-wheel H then turns the middle pinion another half of a revolution, closing the arms of the said holding-head about the gavel, when the operation of binding will be repeated, as before described.

By this mode of connecting the band, the ends being twisted about each other, it is therefore contracted and tightened about the gavel. I do not confine myself to the number of oscillating winding-tines herein specified, as their number may be increased, and they may be arranged upon the perimeter of a revolving or oscillating disk, so as to wind the band any number of times about each other, in the manner described.

Having thus described my invention, what I claim as new, and desire to secure by Letters Patent, is—

1. The herein-described holding-head, consisting of the head-piece D, series of pivoted arms $c\ c$, connecting-links $e$, $e^1$, and $n$, and the operating-lever $c^1$, all combined substantially as and for the purposes herein specified.

2. The combination of the holding-head D, parallel bars $f\ h^6$, head $i^2$, shaft $v^2$, lever $g$, eccentric $o$, and the operating-pinions I¹ I², substantially as and for the purposes herein specified.

3. The holder-operating lever $g$, coil-spring and spring-shaft $v^1$, bar $f$, and the holding-head D, these members all arranged substantially in the manner and for the purposes herein specified.

4. The combination of the head $i^2$, arm $q$, link $e^{12}$, and the swinging holding-head lever $c^1$, substantially as and for the purposes herein specified.

5. The combination of the holding-head shaft $v^2$, holder-rotating pinion I², holder-operating pinion I¹, knotting-mechanism operating-pinion I, and the driving-wheel H, all arranged substantially in the manner and for the purposes herein specified.

6. The combination of the receiver N, swinging apron Q, stop $b$, double gaveling-arms $d^5$ $d^6$, shaft R, and the holding-head D, substantially as and for the purposes herein specified.

7. The combination of the apron Q, gear $y$, arm 4, hub $z$, and the drive-wheel H, substantially as and for the purposes herein specified.

8. The combination of the shaft R, separating-arm $d^5$, gaveling-arm $d^6$, sleeve $p^7$, arm $d^7$, spring 10, and the stop $b$, substantially as and for the purposes herein specified.

9. The combination of the holding-head D, arm $q$, curved arms or tines $d^1\ d^1$, and apron Q, substantially as and for the purposes herein specified.

10. The frame K, holding-head D, swinging apron Q, and the platform $i^4$, these members all arranged substantially in the manner and for the purposes herein specified.

11. In combination with the frame T and the separating-wheel G, the curved guard-piece $v$, substantially as and for the purposes herein specified.

12. The combination of the revolving ring-shaped twisting-head $u$ and the stationary head $t$, all provided with narrow openings and gathering-arms, substantially as shown, and for the purposes herein specified.

13. The combination of the stationary head $t$, spring-piece $s$, ledge $s^6$, twisting-head $u$, and the separating-wheel G, substantially as and for the purposes herein specified.

14. The swinging frame T, arm $h^2$, disk $h^3$, and the shaft R, these members all arranged substantially in the manner and for the purposes herein shown and described.

15. The combination of the head D, bar $f$, reciprocating frame $j$, series of pivoted oscillating tines $i^1$ and $i$, and the operating-bar $h$, substantially as and for the purposes herein specified.

16. The combination of the reciprocating frame $j$, projection $h^9$, lever $d$, rod $d^1$, head D, and the twisting-tine operating-bar $h$, substantially as and for the purposes herein specified.

17. The slotted head-piece D, reciprocating oscillating tines $i^1\ i$, looping-jaw $a^9$, and the flexible reciprocating slide or plate $m$, these members all constructed and arranged to operate in combination, substantially in the manner and for the purposes herein specified.

18. The combination of the winding-tines $i$ $i^1$, frame $j$, rock-arm $h^7$, cam-groove plate F, pinion I, and the segmental drive-wheel H, substantially as and for the purposes herein specified.

19. The combination of the holding-head D, slide $m$, segmental slide $p$, head $i^2$, diagonal ledges $e^{15}$ and $e^5$, and the cam-wheel F, substantially as and for the purposes herein specified.

20. In combination with the frame L¹ L⁴ and the elevator-belt frame B, the arc-plate $e^6$ and the lever $v$, or equivalent, substantially as and for the purposes shown and described.

21. In combination with the swinging elevator-belt frame B and the stationary receiver N, the sliding board X, substantially as and for the purposes herein specified.

22. The drive-wheel H, segment $a^7$, gaveling gear-pinion 5, cross-bar K, and the spring-latch 13, these members all constructed and arranged substantially in the manner and for the purposes herein shown and described.

H. H. BRIDENTHAL, JR.

Witnesses:
ALEX. Y. DOUGLASS,
I. L. CHAMBERS.